April 13, 1948.   E. A. COOKE   2,439,595
BORE GAUGE
Filed March 14, 1944   6 Sheets-Sheet 1

Inventor
E A Cooke

April 13, 1948.　　　E. A. COOKE　　　2,439,595
BORE GAUGE
Filed March 14, 1944　　　6 Sheets-Sheet 2

Inventor
E. A. Cooke
By
Emery Holcombe Blair
Attorneys

April 13, 1948.  E. A. COOKE  2,439,595
BORE GAUGE
Filed March 14, 1944  6 Sheets-Sheet 5

Inventor
E A Cooke
By
Attorneys

April 13, 1948.　　　E. A. COOKE　　　2,439,595
BORE GAUGE
Filed March 14, 1944　　　6 Sheets-Sheet 6

Inventor
E. A. COOKE
By
Attorneys

Patented Apr. 13, 1948

2,439,595

UNITED STATES PATENT OFFICE 2,439,595

BORE GAUGE

Ernest Albert Cooke, Leicester, England, assignor to Taylor, Taylor & Hobson Limited, Leicester, England, a company of Great Britain Application March 14, 1944, Serial No. 526,409

8 Claims. (Cl. 33—178)

This invention relates to bore gauges for effecting precision measurements of the diameters of the cylindrical bores or passages in tubes or other hollow bodies, and has for its object to provide an improved gauge of this kind, particularly, though not exclusively, for gauging gun bores.

To this end a gauge according to the invention comprises a gauge body carrying two relatively movable gauging elements for engaging opposite sides respectively of the bore or hole, means whereby the relative movement between such elements controls an indicating or recording instrument, and two pairs of ligament spring constituting a resilient gimbal suspension by which the gauge body is supported from a guide member slidable along the tube to be gauged. Thus, for example, according to one arrangement the gimbal suspension includes an intermediate annulus or frame connected through the two pairs of ligament springs respectively to the gauge body and guide member or a part adapted to be secured thereto, the two springs of each pair lying substantially opposite to each other whilst the four springs are angularly spaced apart by 90°.

Conveniently the gauge is provided with an adaptor for detachably connecting the guide member to the gauge. This adaptor may be so arranged that when the guide member is connected thereto the guide member lies substantially coaxial with but axially spaced from the gauge body. According to another arrangement the guide member, when connected to the adaptor, lies substantially coaxial with but embraces the gauge body.

The invention may be carried into practice in various ways but two constructions, each according to the invention as applied to a gun-bore gauge, are shown by way of example in the accompanying drawings, in which.

In the construction shown in Figures 1 to 6 the gun-bore gauge comprises a cylindrical casing A connected through four ligament springs $A^1$, $A^2$, $A^3$, $A^4$ and an intermediate floating annulus or frame B, which embraces the said casing A, to a flanged adaptor C which can be detachably connected to a cylindrical guide member $C^1$ which will make an easy fit within the bore $C^2$ to be tested when the diameter of this bore is at its minimum. The adaptor C is in the form of a hollow boss $C^3$ which, when connected to the guide member $C^1$ is coaxial therewith and provides a passage therethrough for the electric connections led through a hollow rod $C^4$ from the gauge to the indicating or recording instrument as hereinafter described.

One pair of parallel ligament springs $A^3$, $A^4$ is connected to the flange $C^5$ of the adaptor C, the rearward ends of these two springs $A^3$, $A^4$ which lie diametrically opposite to each other, being clamped by suitable detachable plates $C^6$ to lands formed on the flange $C^5$. The ligament springs $A^3$, $A^4$ extend from the adaptor C in the direction of the axis thereof, that is to say in the direction of the axis of the bore $C^2$ to be measured to opposite parts of the intermediate floating annulus or frame B which is thus suspended so that though it is free to move transversely to the planes of the two ligament springs $A^3$, $A^4$ connecting it to the adaptor C, the diameter thereof will at all times remain parallel to itself, that is to say the central axis of the annulus B will remain coincident with or parallel to the axis of the guide member $C^1$. The second pair of ligament springs $A^1$, $A^2$ are connected by plates $B^1$, $B^2$ at their forward ends to the floating annulus B at diametrically opposite parts thereof and spaced 90° apart from the other two springs $A^3$, $A^4$, the rearward ends of this second pair of springs $A^1$, $A^2$ being connected by plates $B^3$ to a ring $B^4$ carried by the cylindrical outer portion or casing A of the gauge body.

Figure 4:
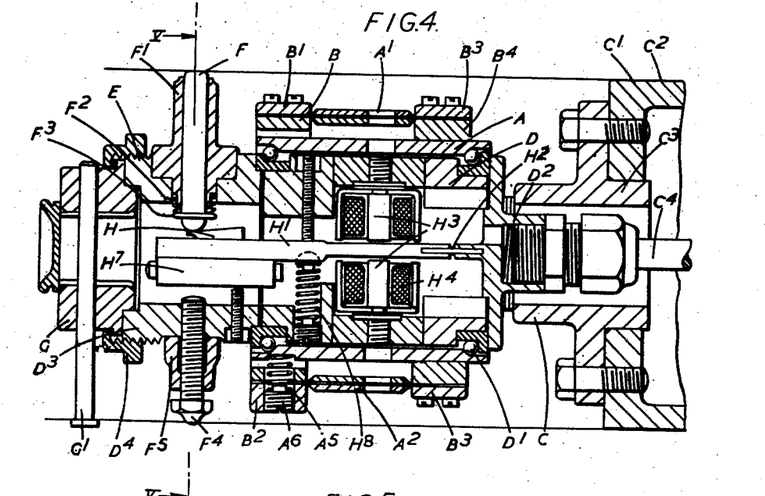
Figure 4 shows the gauge in longitudinal section on the line IV—IV of Figure 1.
Figure 5:
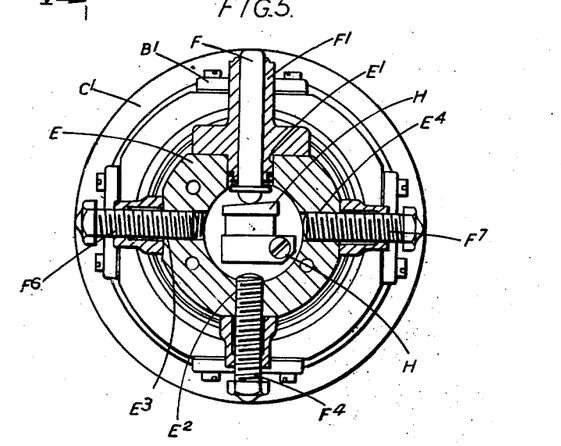
Figure 5 is a transverse section on the line V—V of Figure 4.

Thus, though the cylindrical outer portion or casing A of the gauge body is free, within limits, to move transversely to the axis of the bore $C^2$ to be measured, in all radial directions, the longitudinal axis of the gauge body A will at all times be maintained parallel to the axis of the guide member $C^1$ and the gauging pressure will be maintained approximately constant even should deflections of the guide member $C^1$ take place. In order to counteract the effects of the weight of the gauge body A and the parts carried thereby, a spring $A^5$ is provided acting radially between the cylindrical outer portion of the gauge body A and the adjacent annulus B, this spring $A^5$ being adjustable by means of a grub screw $A^6$ in threaded engagement with a radial passage extending through the plate $B^2$ and acting against the outer end of the spring. When the gauge is in position within the bore $C^2$ to be measured the said spring $A^5$ lies lowermost as shown in Figure 4 and thus acts upwards to take the weight of the gauge body A and the parts carried thereby.

Mounted on the ball bearing $D^1$ within the cylindrical outer portion of the casing A of the gauge body is a hollow inner portion D which is thus rotatable about the main axis of the gauge, that is to say the axis of the adapter C and guide member $C^1$ attached thereto, the rearward end wall of the said inner portion D having an axial hollow boss $D^2$ free to turn in the forward end of the adapter C. The forward end portion E of the inner or rotary gauge portion D projects some distance beyond the forward open end of the outer or fixed body portion A, this forward cylindrical extension having four radial passages $E^1$, $E^2$, $E^3$, $E^4$ which are angularly spaced apart by 90° (Figure 5) but whose longitudinal axes lie in one and the same radial plane. Longitudinally movable within a nipple $F^1$ secured in the radial passage $E^1$ is a short spindle F which has at its outer end a feeler point projecting slightly beyond the adjacent outer end of the surrounding nipple $F^1$, the spindle F being urged radially inwards by a light spring $F^2$ acting between the inner end of the nipple $F^1$ and a flange or cotter $F^3$ carried by the spindle F. The radial passage $F^2$ lying diametrically opposite to the feeler point F is internally screwthreaded for engagement by an externally screwthreaded stud $F^4$ whose outer end constitutes a reaction point. The feeler and reaction points F, $F^4$ thus constitute respectively two relatively movable gauge elements for the purpose hereinafter described, basic adjustment of the reaction point $F^4$ relatively to the feeler point F being effected by turning the reaction stud $F^4$ within its engaging bore and locking it in position by means of a surrounding internally screwthreaded nipple $F^5$. The remaining two radial passages $E^3$, $E^4$ in the forward extension E of the rotary portion D of the gauge body contain respectively two further screwthreaded studs $F^6$, $F^7$ each constructed and arranged in a manner similar to that described for the reaction stud $F^5$ and having at its outer end a suitable steadying point. The steadying points $F^6$, $F^7$ which thus lie diametrically opposite to each other and between the feeler and reaction points F, $F^4$, tend to ensure that, within small limits, the feeler and reaction points F, $F^4$ remain substantially radial with respect to the bore $C^2$ to be measured.

The rim or mouth $D^3$ of the rotary portion D of the gauge body lying forward of the four contact points F, $F^4$, $F^6$, $F^7$ has an external screwthread which is engaged by the internal thread of a locking ring $D^4$ which acts on a radial flange of an end cap or nose piece G so as normally to lock the end cap G to the rotary part D of the gauge body. Extending radially from and diametrically slidable through the end cap G is a follower spindle $G^1$ which can be locked against longitudinal movement through the end cap G. Thus the follower spindle $G^1$ can either be retracted so that its operative end lies clear of the surface of the bore $C^2$ to be tested, and securely locked in this retracted position, or the end cap G and follower spindle $G^1$ can be released and the end cap G turned to adjust the angular position of the follower spindle $G^1$ relatively to the feeler point F so that the follower point bears against the bore $C^2$ to be tested at a predetermined angular spacing with respect to the feeler point F, for the purpose to be described, the end cap G and follower $G^1$ being then firmly locked in the position of adjustment.

Figure 6:
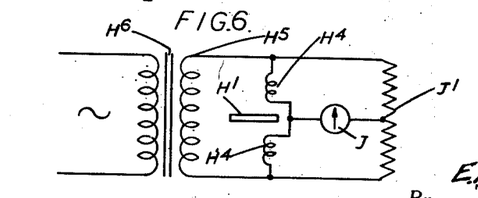
Figure 6 illustrates diagrammatically the electric circuit between the electromagnetic control device of the gauge and the measuring instrument.
Figure 7:
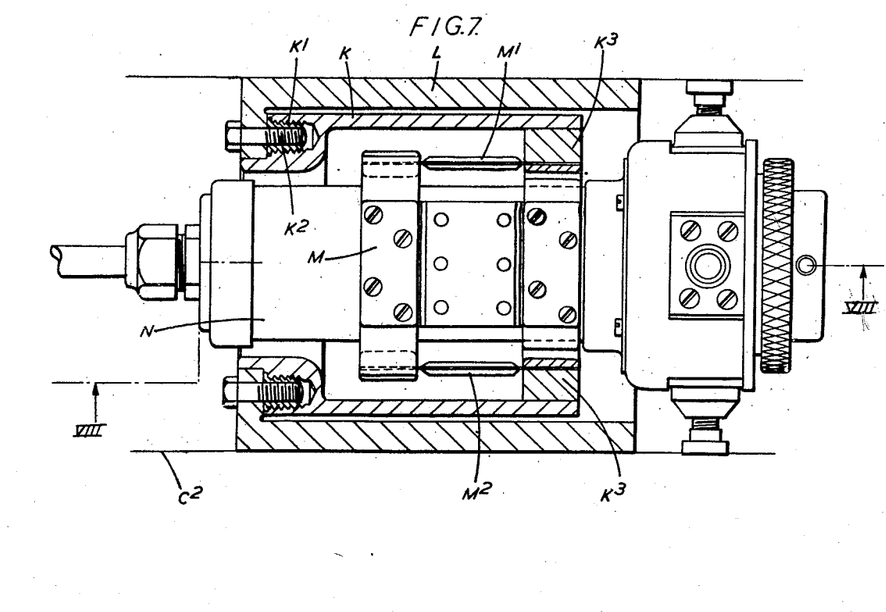
Figure 7 shows another construction of gauge according to the invention, in side elevation and partly in longitudinal section.
Figure 8:
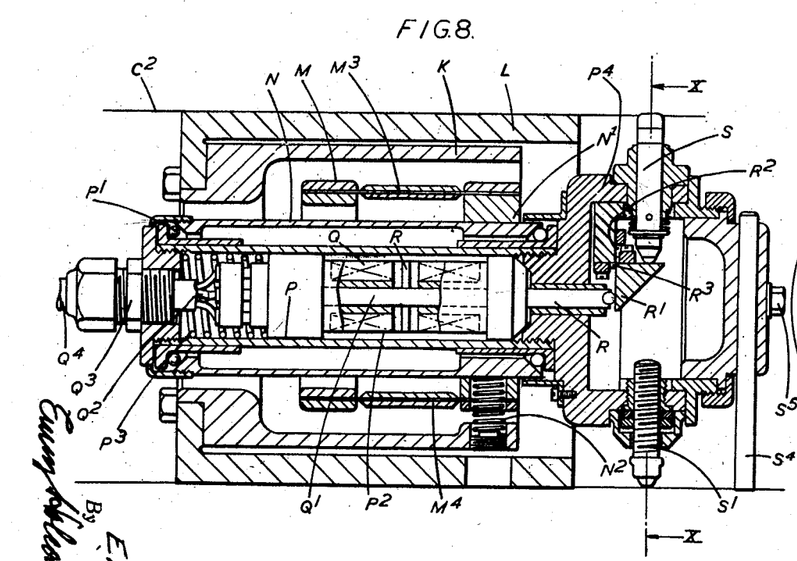
Figure 8 is a longitudinal section on the line VIII—VIII of Figure 7.
Figure 9:
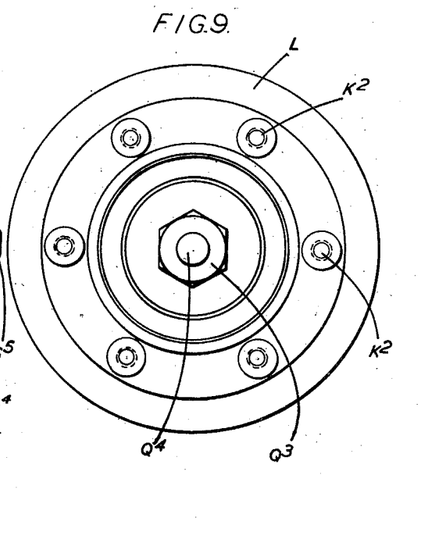
Figure 9 is an end view from left to right of Figure 8.
Figure 10:
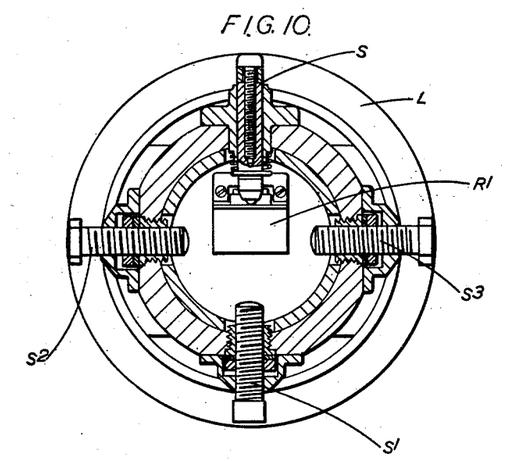
Figure 10 shows the gauge in transverse section on the line X—X of Figure 8.

The inner end of the feeler spindle F bears on a wedge H carried near the forward end of a lever $H^1$ extending axially through the inner or rotary portion D of the gauge body and connected at its rearward end through a ligament spring $H^2$ to the rear wall of the said rotary portion D. A part of the lever $H^1$ lying forward of its suspension point $H^2$ constitutes an armature of an electromagnetic device the relatively fixed portion of which is constituted by two E-shaped cores $H^3$ carried by the inner or rotary portion D of the gauge body so as to lie on opposite sides respectively of the armature $H^1$ in the direction of its pivotal movement about the lever-supporting ligament spring $H^2$. The centre limbs of the two cores $H^3$ respectively carry two coils $H^4$ which are connected in series with one another in the secondary circuit $H^5$ of a supply transformer $H^6$ (Figure 6). The junction between the two coils $H^4$ is connected through a meter J to a tapping point on a resistance $J^1$ across the transformer secondary. The connections to the supply transformer $H^6$ and the meter J are effected by means of conductors carried through the rear wall of the rotary portion D of the gauge body and through the hollow rod $C^4$ which is detachably secured to the hollow boss $D^1$ at the rearward end of the rotary portion D of the gauge body, and thence through the hollow guide member $C^1$. Thus, radial movement of the feeler point F relatively to the gauge body causes corresponding movement of the armature $H^1$ which thereby varies the reluctance of the two magnetic circuits of the coils $H^4$ with consequent variations of the reading of the meter J.

For the purpose of initial adjustment of the feeler point F the wedge H against which the inner end of the feeler spindle bears is adjustable by means of a worm $H^7$ accessible for rotation through the forward end of the rotary portion D of the gauge body, and a gauging-load spring $H^8$ whose tension is adjustable acts between the said rotary portion D and the lever or armature $H^1$ at a point thereon between the coils $H^4$ and the wedge H, the gauging-load spring $H^8$ acting in opposition to the control spring $F^2$ of the feeler spindle F. Thus, since as above described the weight of the gauge body and the parts carried thereby is, at all positions of rotation of the rotary portion D of the gauge body, taken by the spring $A^5$ acting between the annulus B and the outer portion A of the gauge body, the gauging load as determined by the tension of the gauging-load spring $H^8$ will remain substantially constant. Moreover, this constant gauging load can be set so as to be very light thus avoiding the risk of scoring the bore $C^2$ being measured by contact with the gauging points.

Figure 1:
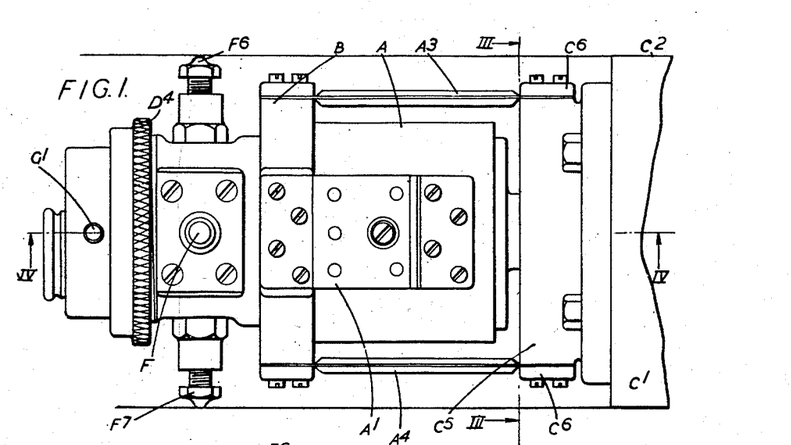
Figure 1 illustrates one construction in side elevation with the gauge inside a bore to be measured, part of the guide member and operating rod being cut away.
Figures 2, 3:
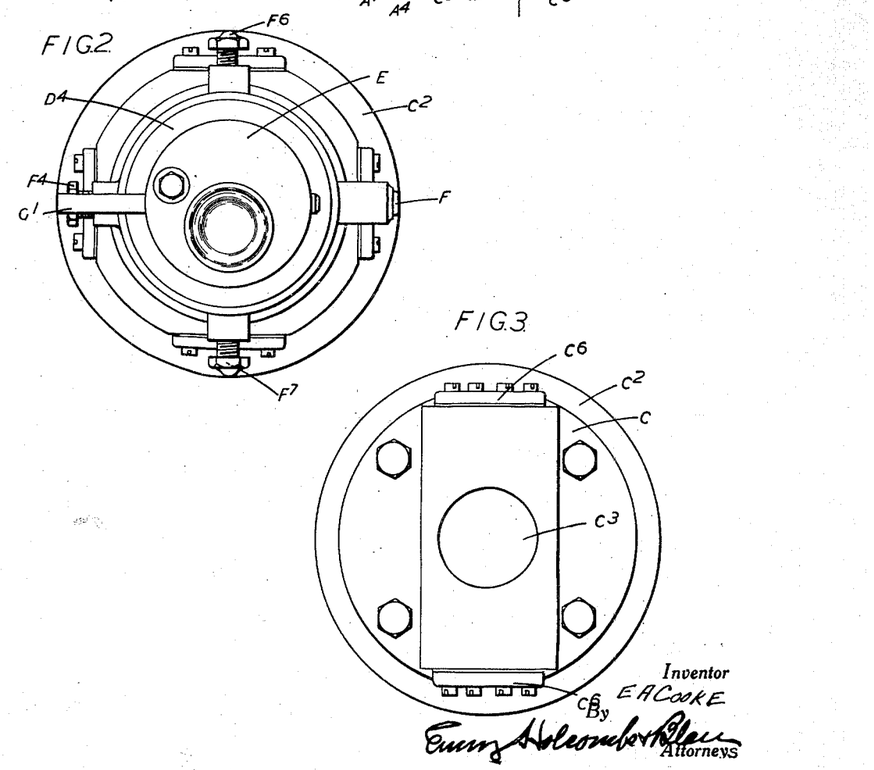
Figure 2 is an end elevation from left to right of Figure 1.
Figure 3 is a section on the line III—III of Figure 1.

When the gauge is to be used for measuring the diameter of a smooth gun bore, the separation of the gauging points F, $F^4$ is initially set by any conventional means, for example by a ring gauge or micrometer, the wedge H and gauging-load spring $H^8$ having been adjusted so that the armature $H^1$ lies centrally between the cores $H^3$ of the electromagnetic device so that the meter J reads zero. The diametrical measurement between the steadying points $F^6$, $F^7$ will be in accordance with the lower limit of the bore $C^2$ to be tested. Having retracted the follower spindle $G^1$ and locked it in the retracted position, the gauge is secured to a guide member $C^1$ suitable to the bore $C^2$ under test by means of the adapter C, and the gauge and guide member $C^1$ are pushed into the bore $C^2$ by means of the rod $C^4$ so that the spring $A^5$ acting between the annulus B and the gauge body A lies lowermost, as shown in Figure 1. Having pushed the gauge through the bore $C^2$ and noted the reading of the meter J, the rotary portion D of the gauge body is turned relatively to the fixed portion or casing A thereof through a small angle and the gauge again pushed through the bore $C^2$. These steps are repeated until it is considered that the bore $C^2$ has been effectively checked. If the bore diameter is below the value desired the resulting inward movement of the feeler point F will cause corresponding movement of the lever or armature $H^1$ about its pivot $H^2$ and the armature will vary the reluctance of the two magnetic circuits thus giving a reading on the meter J.

If the test is made while the barrel $C^2$ is in the process of being bored the guide member $C^1$ may be attached to or form part of the boring bar thus reducing interruptions of the boring process for testing purposes. If, however, the gauge is being used for inspection purposes with the gun barrel $C^2$ supported on trestles the gauge, attached to a guide member $C^1$ suitable to the bore $C^2$, will be pushed (or pulled as by means of a cord) through the bore $C^2$ until an effective test has been completed.

When the gauge is to be employed for gauging the bore of a rifled barrel the follower spindle $G^1$ and the end cap G are released and the end cap G turned until the operative end of the follower $G^1$ lies on the base of one of the rifling grooves whilst the feeler point F lies on one of the crests. The follower spindle $G^1$ and the end cap G are then locked in their positions of adjustment and the gauge is pulled or pushed through the bore. This process may be repeated for each groove, the rotary portion D of the gauge body as this moves through the bore being rotated in accordance with the helix angle of the rifling so as to test the bore at the crest throughout its length.

According to the modified construction of gun-bore gauge shown in Figures 7 to 12 a hollow cylindrical adapter K is provided at its rearward end with threaded sockets $K^1$, for attachment of a cylindrical guide member L which, when secured to the adapter K by a number of circumferentially spaced studs $K^2$, embraces the cylindrical adapter K. The forward end of the adapter K is connected through a pair of distance pieces $K^3$ at diametrically opposite parts thereof to the forward ends of two ligament springs $M^1$, $M^2$ respectively, the rearward ends of this pair of ligament springs being clamped, as above described, to diametrically opposite parts of a floating annulus M which embraces but is radially spaced from the outer cylindrical portion N of the gauge body. The rearward ends of two further ligament springs $M^3$, $M^4$ are secured to the annulus M at diametrically opposite parts thereof so that the springs $M^3$, $M^4$ are angularly spaced by 90° from the springs $M^1$, $M^2$. The forward ends of the second pair of springs $M^3$, $M^4$ are connected to an annular rim $N^1$ carried by the outer portion or casing N of the gauge body so that the latter, whilst free within limits to move radially in all directions relatively to the guide member L, will at all times be maintained with its longitudinal axis parallel to the main axis, that is to say, the axis of the guide member L.

Figure 11:
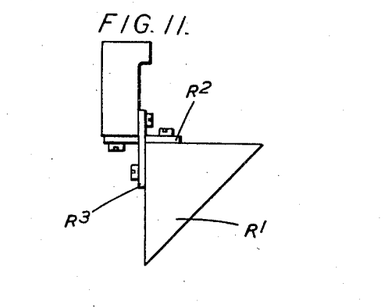
Figure 11 is an enlarged view of part of Figure 8.
Figure 12:
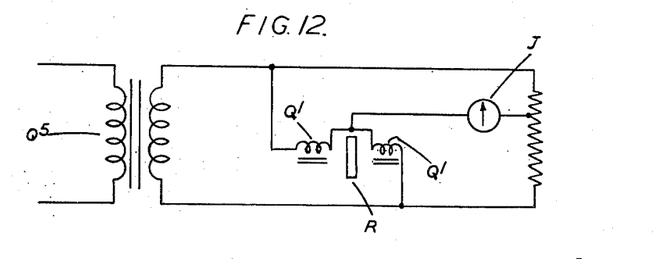
Figure 12 illustrates diagrammatically the electric circuit between the electromagnetic control device of the gauge shown in Figure 8 and the measuring instrument.

Mounted in ball bearings $P^1$ within the outer portion or casing N of the gauge body is an inner tubular or rotary portion P which can thus turn about the main axis. Arranged within the inner or rotary portion P is a tubular housing $P^2$ which is urged forwards within the rotary portion by an overload spring $P^3$, thus housing $P^2$ containing the cores Q and coils $Q^1$ of an electromagnetic device from which conductors $Q^2$ lead through a suitable detachable plug $Q^3$ in the read wall of the rotary portion P of the gauge body and thence through a hollow rod $Q^4$ to the power unit $Q^5$ and meter J (Figure 12). An Armature R is axially movable within the housing $P^2$ and relatively to the coils $Q^1$ is operated against the action of a light spring (not shown) by one face of an angle block $R^1$ supported within a casing $P^4$ mounted at the forward end of the rotary portion P of the gauge body. The angle block $R^1$ is supported by two pairs of ligament springs $R^2$, $R^3$ extending parallel to and secured to the two right angled faces of the angle block $R^1$ respectively as shown in Figure 11, so that the block $R^1$ can tilt about an axis coincident with the point of intersection of the two pairs of springs $R^2$, $R^3$. Bearing against the other face of the angle block is the inner end of a spindle S of a feeler point, this spindle, as also the associated reaction spindle $S^1$, steadying spindles $S^2$, $S^3$ and follower spindle $S^4$, being constructed and arranged as in the construction above described, the follower spindle being locked in the position of adjustment by a turret lock $S^5$. Similarly, the weight of the gauge body is taken by a spring $N^2$, which, when the gauge is in position within the bore $C^2$ to be measured, lies beneath the gauge body.

The operation of this construction is the same as for that first described, the gauge and guide member L attached thereto being either pulled or pushed through the bore to be measured.

Figure 13:
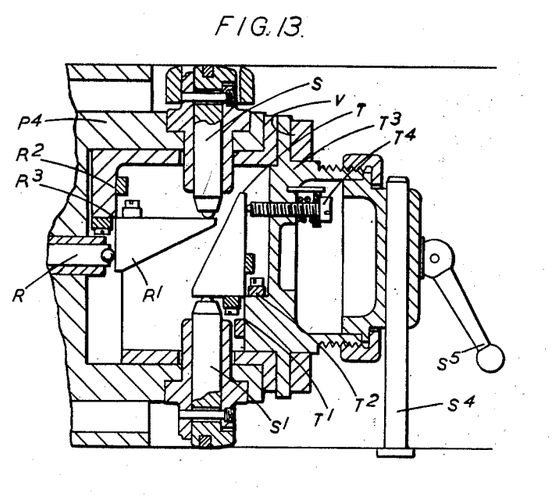
Figure 13 is a longitudinal section through the head portion of a gauge which is a modification of that shown in Figure 8.
Figure 14:
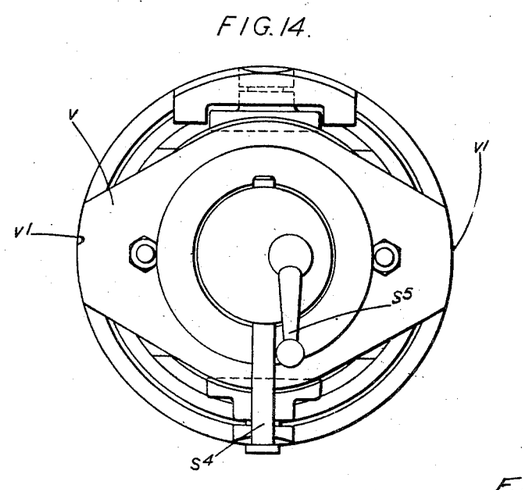
Figure 14 shows the gauge head of Figure 13 in end elevation.

A modified arrangement of the gauge head, as described above with reference to Figure 8, is shown in Figures 13 and 14 in which parts having the same functions as those of the corresponding parts in Figure 8 are given the same references. In Figures 13 and 14 the reaction spindle $S^1$ instead of being in screwthreaded engagement with the casing $P^4$ bears against one face of an angle block T carried within an end piece $T^3$ by two spring ligaments $T^1$, $T^2$ arranged as described with reference to Figure 11. A spring loaded adjusting stud $T^4$ in threaded engagement with the end piece T³ bears against the angle block T so that by adjusting the studs T⁴ the effective initial diametrical spacing between the feeler points of the spindles S and S¹ can be set as desired. It will be seen from Figure 14 that instead of utilizing two steadying spindles S², S³ as in Figure 10, a steadying plate V is employed the two ends V¹ of the steadying plate constituting steadying elements which reduce the risk of gauging taking place in a plane which is not radial with respect to the bore being measured.

It will be understood that the constructions above described are given by way of example only and that modifications both of construction and arrangement may be effected to suit requirements. Further, though the invention has been specifically described as applied to a gun-bore gauge the invention is also applicable for gauging any cylindrical bore or passage formed either in tubes or other workpieces. Whatever the type of workpiece to which the gauge is applied, however, the resilient gimbal suspension for the gauge body will ensure that the gauge is independent of errors of mounting so that a bore can be measured throughout its length with a high degree of accuracy. Moreover, the gauging pressure will remain substantially constant in all positions of the gauge and can be maintained so light as to preclude risk of scoring of the bore by the gauging points.

What I claim as my invention and desire to secure by Letters Patent is:

1. A gauge for effecting precision measurement of the diameter of a cylindrical passage in a workpiece comprising a gauge body, two relatively movable gauging elements carried by said gauge body and extending radially with respect to the cylindrical passage for engaging opposite sides respectively of said passage, means whereby relative movement between said gauging elements controls a measuring instrument, an annulus embracing a portion of said gauge body, a substantially cylindrical guide member slidable along the passage to be gauged, spring ligament means connecting said annulus to said guide member, and spring ligament means connecting said gauge body to said annulus for parallel motion relative to said guide member.

2. A gauge for effecting precision measurement of the diameter of a cylindrical bore or passage in a tube or other workpiece, comprising a gauge body, two relatively movable gauging elements carried by the gauge body and extending radially with respect to the bore for engaging opposite sides respective of said bore, means whereby relative movement between said gauging elements controls a measuring instrument, an annulus embracing a portion of the gauge body, a substantially cylindrical guide member slidable along the bore to be gauged, a pair of spring ligaments connecting the guide member to the annulus, and a pair of spring ligaments connecting said annulus in a floating relation to the gauge body, the two spring ligaments of each pair lying diametrically opposite to each other with the four ligaments substantially equally spaced apart around the gauge body.

3. A gauge for effecting precision measurement of the diameter of a cylindrical bore or passage in a tube or other workpiece, comprising a gauge body, two relatively movable gauging elements carried by the gauge body and extending radially with respect to the bore for engaging opposite side respectively of said bore, means whereby relative movement between said gauging elements controls a measuring instrument, an annulus embracing a portion of the gauge body, a substantially cylindrical guide member slidable along the bore to be gauged, an adapter, means connecting said adapter to the cylindrical guide, a pair of spring ligaments connecting the adapter to the annulus, and a pair of spring ligaments connecting the annulus to the gauge body, the two spring ligaments of each pair lying diametrically opposite to each other with the four ligaments substantially equally spaced apart around the gauge body.

4. A gauge for effecting precision measurement of the diameter of a cylindrical bore or passage in a tube or other workpiece, comprising a gauge body, two relatively movable gauging elements carried by the gauge body and extending radially with respect to the bore for engaging opposite sides respectively of said bore, means whereby relative movement between said gauging elements controls a measuring instrument, an annulus embracing a portion of the gauge body, a substantially cylindrical guide member axially spaced from the gauge body and slidable along the bore to be gauged, a pair of spring ligaments connecting the said annulus in a floating relation to the gauge body, the two spring ligaments of each pair lying diametrically opposite to each other with the four ligaments substantially equally spaced apart around the gauge body.

5. A gauge for effecting precision measurement of the diameter of a cylindrical bore or passage in a tube or other workpiece, comprising a gauge body, two relatively movable gauging elements carried by the gauge body and extending radially with respect to the bore for engaging opposite sides respectively of said bore, means whereby relative movement between said gauging elements controls a measuring instrument, an annulus embracing a portion of the gauge body, a substantially cylindrical guide member axially spaced from the gauge body and slidable along the bore to be gauged, an adapter, means connecting said adapter to the cylindrical guide, a pair of spring ligaments connecting the adapter to the annulus, and a pair of spring ligaments connecting the annulus in a floating relation to the gauge body, the two spring ligaments of each pair lying diametrically opposite to each other with the four ligaments equally spaced apart around the gauge body.

6. A gauge for effecting precision measurement of the diameter of a cylindrical bore or passage in a tube or other workpiece, comprising a gauge body, two relatively movable gauging elements carried by the gauge body and extending radially with respect to the bore for engaging opposite sides respectively of said bore, means whereby relative movement between said gauging elements controls a measuring instrument, an annulus embracing a portion of the gauge body, a substantially cylindrical guide member embracing a portion of the gauge body and slidable along the bore to be gauged, a pair of spring ligaments connecting the guide member to the annulus, and a pair of spring ligaments connecting said annulus in a floating relation to the gauge body, the two spring ligaments of each pair lying diametrically opposite to each other with the four ligaments substantially equally spaced apart around the gauge body.

7. A gauge for effecting precision measurement of the diameter of a cylindrical bore or passage in a tube or other workpiece, comprising a gauge body including an outer portion or casing and an inner portion having a generally circular cross-section and rotatable about its axis of generation within the outer portion, two relatively movable gauging elements carried by said inner or rotary portion and extending transversely to its axis of rotation for engaging opposite sides respectively of the bore to be gauged, means whereby relative movement between said gauging elements controls a measuring instrument, an annulus embracing the gauge body, a substantially cylindrical guide member slidable along the bore to be gauged, a pair of spring ligaments connecting the guide member to the annulus, and a pair of spring ligaments connecting said annulus in a floating relation to the outer portion of the gauge body, the two spring ligaments of each pair lying diametrically opposite to each other with the four ligaments substantially equally spaced apart around the gauge body.

8. A gauge for effecting precision measurement of the diameter of a cylindrical bore or passage in a tube or other workpiece, comprising a gauge body including an outer portion or casing and an inner portion having a generally circular cross-section and rotatable about its axis of generation within the outer portion, two balanced coils carried by the inner or rotary portion, an armature associated with said coils, two relatively movable gauging elements carried by said inner or rotary portion and extending transversely to its axis of rotation for engaging opposite sides respectively of the bore to be gauged, means whereby relative movement of the gauging elements causes corresponding relative movement of the armature and balanced coils thus varying the reluctance of the magnetic circuit thereof for controlling the energization of an electric measuring instrument, an annulus embracing a portion of the gauge body, a substantially cylindrical guide member slidable along the bore to be gauged, a pair of spring ligaments connecting the guide member to the annulus, and a pair of spring ligaments connecting said annulus in a floating relation to the outer portion of the gauge body, the two spring ligaments of each pair lying diametrically opposite to each other with the four ligaments equally spaced apart around the gauge body.

ERNEST ALBERT COOKE.

REFERENCES CITED

The following references are of record in the file of this patent:

UNITED STATES PATENTS

| Number | Name | Date |
|---|---|---|
| 1,329,456 | Carpenter | Feb. 3, 1920 |
| 2,025,748 | Howe | Dec. 31, 1935 |
| 2,134,262 | Phillips | Oct. 25, 1938 |
| 2,151,477 | Lee | Mar. 21, 1939 |
| 2,239,981 | Terry | Apr. 29, 1941 |
| 2,312,222 | Tanner | Feb. 23, 1943 |
| 2,370,220 | Aller | Feb. 27, 1945 |

FOREIGN PATENTS

| Number | Country | Date |
|---|---|---|
| 512,091 | Great Britain | 1939 |